US009661258B2

(12) United States Patent
Hamilton

(10) Patent No.: US 9,661,258 B2
(45) Date of Patent: *May 23, 2017

(54) HOME MEDIA SERVER CONTROL

(71) Applicant: Intel Corporation, Santa Clara, CA (US)

(72) Inventor: Chris Hamilton, Montclair, NJ (US)

(73) Assignee: Intel Corporation, Santa Clara, CA (US)

( * ) Notice: Subject to any disclaimer, the term of this patent is extended or adjusted under 35 U.S.C. 154(b) by 440 days.

This patent is subject to a terminal disclaimer.

(21) Appl. No.: 14/092,157

(22) Filed: Nov. 27, 2013

(65) Prior Publication Data

US 2014/0089971 A1 Mar. 27, 2014

Related U.S. Application Data

(63) Continuation of application No. 13/339,253, filed on Dec. 28, 2011, now Pat. No. 8,750,686, which is a
(Continued)

(51) Int. Cl.
*H04N 21/214* (2011.01)
*H04N 5/76* (2006.01)
(Continued)

(52) U.S. Cl.
CPC .............. *H04N 5/76* (2013.01); *G11B 27/034* (2013.01); *H04L 29/06* (2013.01);
(Continued)

(58) Field of Classification Search
CPC ....... H04N 21/00244; H04N 21/42203; H04N 21/4316; H04N 21/472
See application file for complete search history.

(56) References Cited

U.S. PATENT DOCUMENTS 5,029,014 A * 7/1991 Lindstrom ........... G11B 27/002
348/E7.024
5,164,839 A * 11/1992 Lang ....................... G11B 5/86
348/E7.04
(Continued)

FOREIGN PATENT DOCUMENTS

IL WO 9926415 A1 * 5/1999 ......... H04N 7/17345
KR WO 0075824 A1 * 12/2000 ............. G06Q 30/02
(Continued)

OTHER PUBLICATIONS

Office Action dated Feb. 12, 2016 in U.S. Appl. No. 14/092,134, and related attachments (15 pages).
(Continued)

*Primary Examiner* — Huy T Nguyen
(74) *Attorney, Agent, or Firm* — Christopher K. Gagne

(57) ABSTRACT

New forms of entertainment can result from this method of selecting, identifying, and storing by a media producer of multi-media content as files to a storage medium within an editing platform. Generating, using an editing software program, a set of instructions and data for assembly of an edited program, the edited program including specified segments from the files of the multi-media content. Assembling the specified segments using the set of instructions and data to form the edited program. Storing the edited program on the editing platform. Analyzing, using a software program, endpoint frames of each segment in the edited program, the analysis resulting in analysis data stored on the editing platform. Distributing the information to a home media server. Emulating assembly of the edited program by the home media server using the information and a home media server editing program, the assembled edited program being stored in the home media server.

15 Claims, 3 Drawing Sheets

Related U.S. Application Data continuation of application No. 10/071,571, filed on Feb. 8, 2002, now Pat. No. 8,150,235.

(51) Int. Cl.

| | | |
|---|---|---|
| *G11B 27/034* | (2006.01) | |
| *H04L 29/06* | (2006.01) | |
| *H04N 21/45* | (2011.01) | |
| *H04N 21/454* | (2011.01) | |
| *H04N 21/458* | (2011.01) | |
| *H04N 21/6543* | (2011.01) | |
| *H04N 21/81* | (2011.01) | |
| *H04N 21/854* | (2011.01) | |
| *H04N 21/24* | (2011.01) | |
| *H04N 21/25* | (2011.01) | |
| *H04N 21/258* | (2011.01) | |
| *H04N 21/61* | (2011.01) | |
| *H04N 21/235* | (2011.01) | |

(52) U.S. Cl.
CPC .... *H04L 29/06027* (2013.01); *H04L 65/4076* (2013.01); *H04L 65/4084* (2013.01); *H04L 65/605* (2013.01); *H04N 21/2143* (2013.01); *H04N 21/235* (2013.01); *H04N 21/24* (2013.01); *H04N 21/251* (2013.01); *H04N 21/25866* (2013.01); *H04N 21/454* (2013.01); *H04N 21/458* (2013.01); *H04N 21/4516* (2013.01); *H04N 21/6175* (2013.01); *H04N 21/6543* (2013.01); *H04N 21/812* (2013.01); *H04N 21/8193* (2013.01); *H04N 21/854* (2013.01)

(56) References Cited

U.S. PATENT DOCUMENTS

| | | | |
|---|---|---|---|
| 5,436,653 A | 7/1995 | Ellis et al. | |
| 5,999,173 A | 12/1999 | Ubillos | |
| 6,477,315 B1 * | 11/2002 | Ohomori | G11B 27/034 345/629 |
| 6,599,194 B1 | 7/2003 | Smith | |
| 6,694,087 B1 * | 2/2004 | Weaver | G11B 27/034 386/282 |
| 6,757,482 B1 | 6/2004 | Ochiai et al. | |
| 7,032,177 B2 | 4/2006 | Novak et al. | |
| 7,055,166 B1 | 5/2006 | Logan et al. | |
| 7,353,166 B2 * | 4/2008 | Li | H04N 5/44543 348/E5.105 |
| 2001/0005446 A1 | 6/2001 | Uchikoga | |
| 2002/0073220 A1 | 6/2002 | Lee | |
| 2002/0114613 A1 * | 8/2002 | Thai | G11B 27/034 386/213 |
| 2002/0124249 A1 * | 9/2002 | Shintani | H04N 5/76 725/32 |
| 2002/0138843 A1 * | 9/2002 | Samaan | H04N 7/17318 725/87 |
| 2003/0093790 A1 | 5/2003 | Logan et al. | |
| 2003/0126611 A1 | 7/2003 | Chernock et al. | |
| 2007/0094407 A1 * | 4/2007 | Serenyi | H04L 29/06 709/231 |
| 2009/0288110 A1 | 11/2009 | Logan et al. | |
| 2011/0126246 A1 | 5/2011 | Thomas et al. | |
| 2012/0272262 A1 | 10/2012 | Alexander | |

FOREIGN PATENT DOCUMENTS

| | | |
|---|---|---|
| WO | 9926415 A1 | 5/1999 |
| WO | 0075824 A1 | 12/2000 |

OTHER PUBLICATIONS

Office Action dated Feb. 17, 2016 in U.S. Appl. No. 14/092,153, and related attachments (14 pages).
Office Action dated Feb. 22, 2016 in U.S. Appl. No. 14/092,157, and related attachments (17 pages).
Office Action dated Jul. 22, 2016 in U.S. Appl. No. 14/092,134, and related attachments (16 pages).
Office Action dated Jul. 22, 2016 in U.S. Appl. No. 14/092,153, and related attachments (21 pages).
Office Action dated Jul. 26, 2016 in U.S. Appl. No. 14/092,157, and related attachments (19 pages).
Office Action dated Nov. 3, 2016 in U.S. Appl. No. 14/092,134, and related attachments (11 pages).
Office Action dated Nov. 2, 2016 in U.S. Appl. No. 14/092,153, and related attachments (11 pages).
Office Action dated Nov. 3, 2016 in U.S. Appl. No. 14/092,157, and related attachments (11 pages).
Final Office Action received for U.S. Appl. No. 10/071,571, filed Jun. 3, 2010, 18 pages.
Non-Final Office Action received for U.S. Appl. No. 10/071,571, mailed on Jan. 20, 2011, 25 pages.
Non-Final Office Action received for U.S. Appl. No. 10/071,571, mailed on Jun. 27, 2011, 19 pages.
Non-Final Office Action received for U.S. Appl. No. 10/071,571, mailed on Mar. 11, 2009, 20 pages.
Non-Final Office Action received for U.S. Appl. No. 10/071,571, mailed on Sep. 29, 2009, 21 pages.
Notice of Allowance received for U.S. Appl. No. 10/071,571, mailed on Dec. 1, 2011, 13 pages.
Response to Final Office Action received for U.S. Appl. No. 10/071,571, filed Nov. 3, 2010, 19 pages.
Response to Non-Final Office Action received for U.S. Appl. No. 10/071,571, filed Apr. 13, 2011, 15 pages.
Response to Non-Final Office Action received for U.S. Appl. No. 10/071,571, filed Jun. 15, 2009, 12 pages.
Response to Non-Final Office Action received for U.S. Appl. No. 10/071,571, filed Mar. 29, 2010, 11 pages.
Response to Non-Final Office Action received for U.S. Appl. No. 10/071,571, filed Sep. 22, 2011, 13 pages.
Non-Final Office Action received for U.S. Appl. No. 13/339,253, mailed on Jul. 3, 2013, 9 pages.
Notice of Allowance received for U.S. Appl. No. 13/339,253, Mailed on Jan. 8, 2014, 8 pages.
Response to Non-Final Office Action received for U.S. Appl. No. 13/339,253, filed Nov. 7, 2013, 9 pages.
Tokmakoff, et al., "Home Media Server content management", Proceedings of SPIE, vol. 4519, XP009017768, 2001, pp. 168-179.
U.S. Appl. No. 14/092,153, filed Nov. 27, 2013, 14 pages of Specification, and 3 pages of drawings.
U.S. Appl. No. 14/092,134, filed Nov. 27, 2013, 14 pages of Specification, and 3 pages of drawings.

* cited by examiner

HOME MEDIA SERVER CONTROL

CROSS-REFERENCE TO RELATED APPLICATIONS

This application is a continuation of U.S. patent application Ser. No. 13/339,253 filed Dec. 28, 2011, which is a continuation of prior U.S. patent application Ser. No. 10/071,571 filed Feb. 8, 2002, now U.S. Pat. No. 8,150,235.

BACKGROUND OF THE INVENTION

Field of the Invention

The present invention generally relates to home media servers. More particularly, the present invention relates to home media server content management and processing.

Discussion of the Related Art

Consumers are beginning to own home media servers or set-top boxes (such as TiVo) that have powerful media processing capabilities. These units are capable of downloading content over networks and digitally recording many hours of movies, television programs, music, game software, advertisements, etc. Consumers will soon own large libraries of television and other content for their personal enjoyment.

Already, the set-top box is becoming a popular adjunct to TV viewing. Acting as an intelligent personal video recorder, a set-top box can "pause" broadcast video, receive TV listings, and store and display directed advertising. The several technologies that enable the disclosed invention, including video editing software, are well known to those skilled in the art.

Media producers today produce content and then distribute it to the public. Television producers shoot video, record voiceovers, license historical clips, etc., and distribute the resulting edited content to the public via various media. Likewise, music is produced in a studio, using live musicians or licensed musical samples, and distributed on compact discs or digitally over the Internet. These are costly methods of media production.

Therefore, there is a need for an improved method of producing media products at low cost that enables consumers to re-use home content as raw materials.

DETAILED DESCRIPTION

The present invention allows instructions from media producers to control home media servers in a way that adds value to home content libraries. A home media server, such as a set-top box, stores, manages, and processes consumer content, such as movies and music. The present invention enables media producers to provide valuable media server content management and content processing software to the public. In one embodiment, messages to video editing software running on a home media server allow the intelligent playback of home content in new and appealing combinations.

New forms of entertainment can result from this method of selecting, synchronizing, editing, mixing, and displaying home content. With the present invention, home recordings become an open source of content on top of which media producers are able to create new layers of media products for the public. Generally, this method enables the processing and combining of home content and software within a home media server to allow new applications, games, and entertainment to be displayed. In particular, robust methods of home content recognition, selection, segmentation, and synchronization are disclosed.

Figure 1:
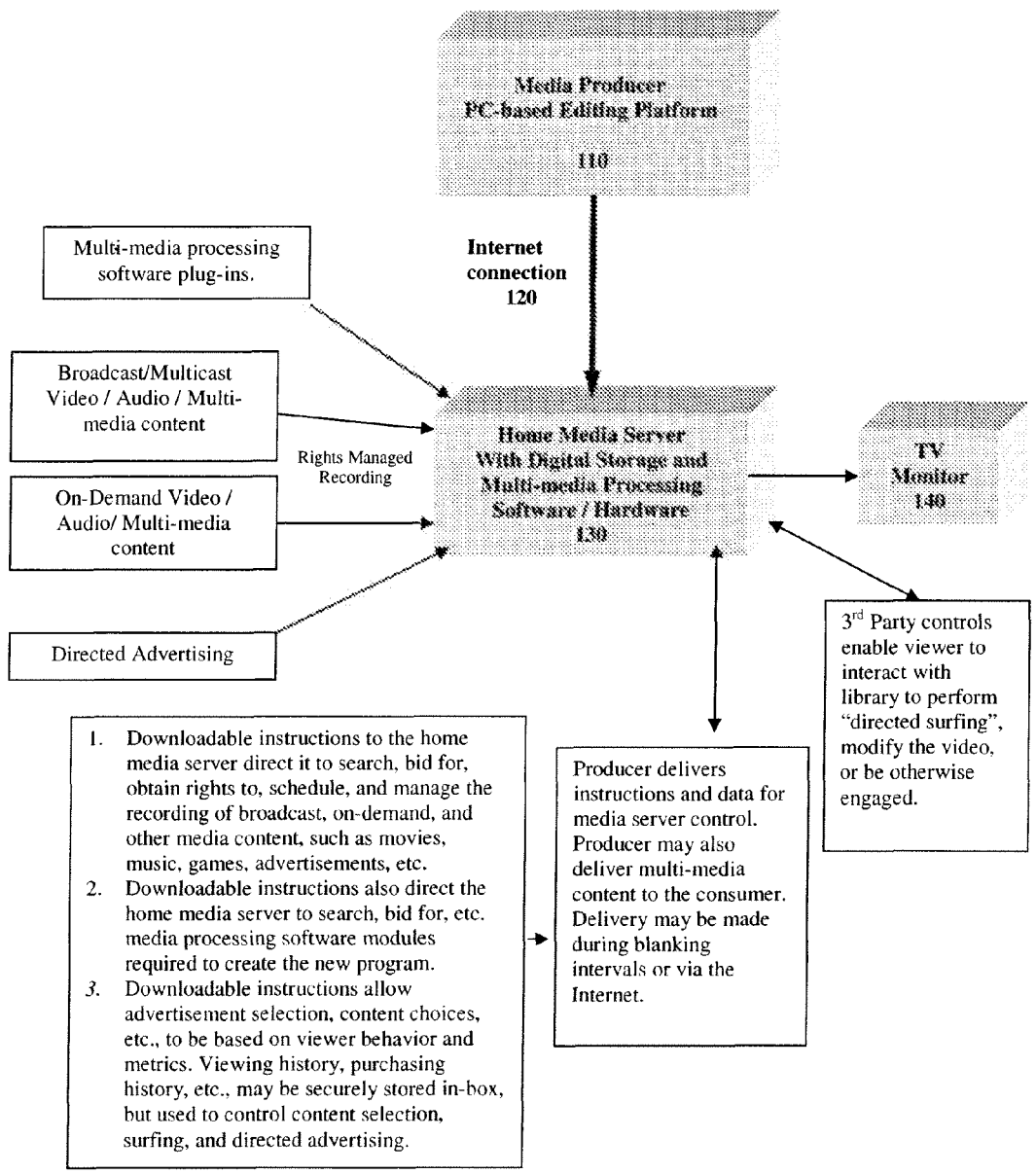
FIG. 1 illustrates a home media server content management and processing system according to an embodiment of the present invention.

FIG. 1 illustrates a home media server content management and processing system. A media producer using an editing platform 110 running editing software, creates and stores a database containing producer specified multi-media content. The producer generates a set of instructions and data to assemble an edited program using specified segments from the multi-media content database. The assembled edited program is viewed real-time and stored on the storage medium of the editing platform 110. The set of instructions, data, and multi-media content in the public domain or that the producer has secured rights to, are distributed via the Internet, or other connection, to home media servers 130.

A home media server 130 receives the set of instructions, data, and multi-media content from the editing platform 110 via the Internet 120 or other connection. The home media server 130 emulates the assembly of the edited program using the set of instructions, data, and multi-media content, displays the assembled edited program in real-time on a monitor 140, and stores the assembled edited program in the home media server 130.

Figure 2:
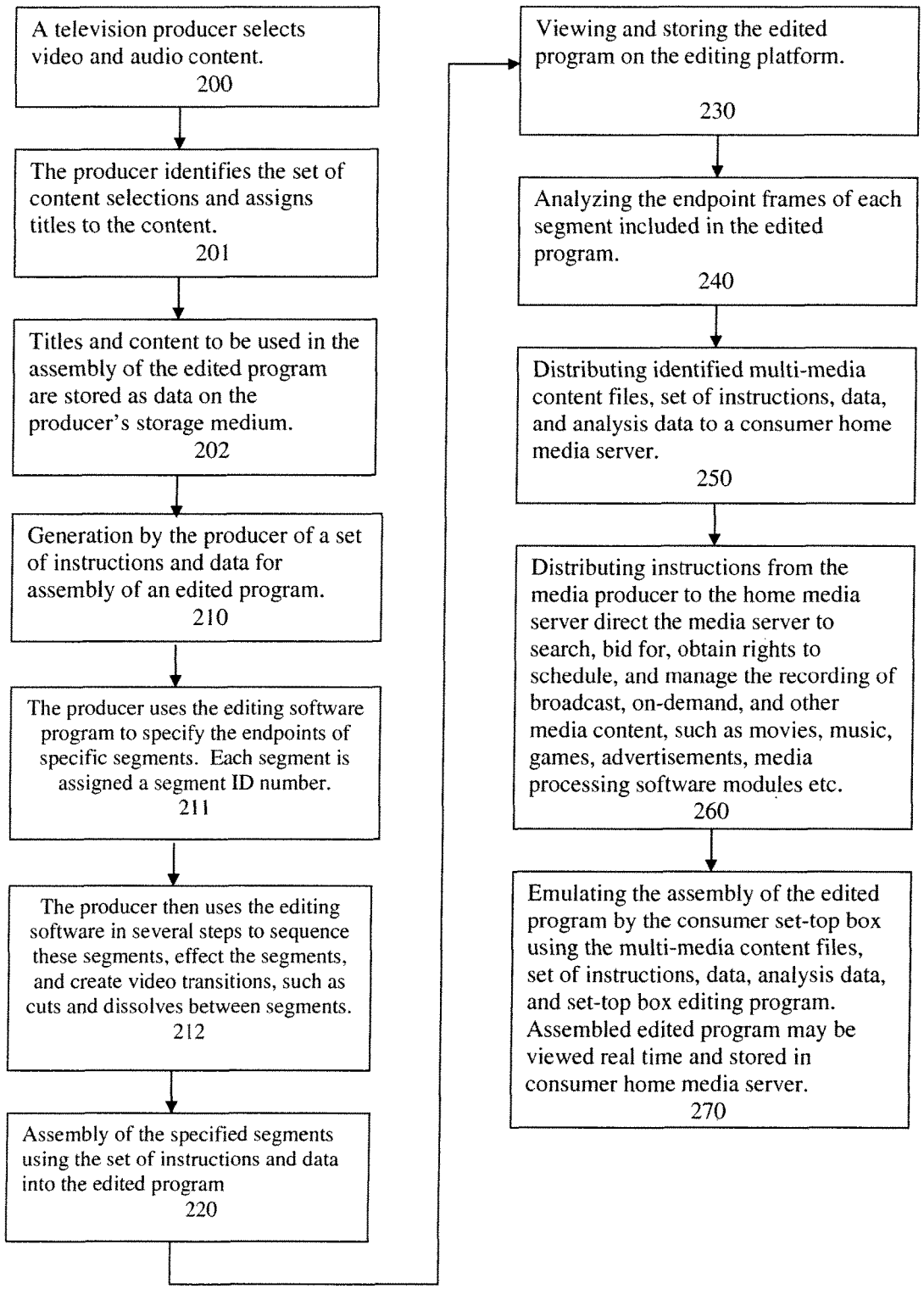
FIG. 2 illustrates a flow chart diagram of a method for providing home media server content management and processing according to an embodiment of the present invention.

FIG. 2 illustrates a flow chart diagram of a method for providing home media server content management and processing according to an embodiment of the present invention. A television producer selects 200 video and audio content, such as original works of art or movies and music that are available to the public, in the public domain, or that the producer has secured rights to, for instance, through downloaded files over the Internet.

The titles identifying 201 the set of content selections (such as movie and song titles), as well as the content that will be used in the assembly of the edited program are stored 202 as data files on the producer's storage medium within his/her editing platform. Sample systems may include a Pentium IV PC, Apple McIntosh or any equivalent computer-based editing platform running video-editing software, such as Avid, Adobe Premiere or other equivalent software.

The producer may also create original video, audio, and software, and integrate them into a new program as well. Such content is also stored as media files on the producer's storage medium within his editing platform. Content files may be stored in various media formats, such as Moving Pictures Experts Group 4, also known as MPEG4 (specification ISO/IEC JTC1/SC29/WG11 N4030, INTERNATIONAL ORGANISATION FOR STANDARDISATION ORGANISATION INTERNATIONALE DE NORMALISATION, published March 2001) and MP3, a subset of MPEG1 (specification ISO/IEC JTC1/SC29/WG11 NMPEG 96, INTERNATIONAL ORGANISATION FOR STANDARDISATION ORGANISATION INTERNATIONALE DE NORMALISATION, published June 1996).

The producer generates 210 a set of instructions and data for the assembly of an edited program. The producer uses the editing software program to specify 211 the endpoints of specific segments within those content files that will be used to assemble an edited video program. One sample set of segments may be specific scenes from several different movies starring a specific actor. Each segment is assigned 211 a segment ID number.

The producer then uses the editing software in several steps 212 to sequence these segments, and manipulate, i.e., effect the segments, and create video transitions, such as cuts and dissolves between segments. The producer may also mix and sequence several audio segments in a similar fashion. Methods for implementing such steps are known to those in the art.

A final edited video program, including audio, is then assembled 220 using these steps and stored for viewing 230 on the producer's computer. All these editing steps are stored 230 as a set of data, which is used by the producer's video-editing software to assemble the edited program. This same data is distributed 250 to home media servers over the Internet.

Analysis software running on the PC analyzes 240 the endpoint frames (e.g., the first and last $1/30^{th}$ sec.) of each segment that was used to create the edited program. The results of such analysis are stored as additional data to be distributed 250 to home media servers in like fashion. An example of such analysis may be the Fast Fourier Transform (FFT) of each endpoint frame, stored in the following format:

Title/segmentID/startFFT/endFFT

Video frames may be represented by two-dimensional FFTs, whereas audio frames may be represented by one-dimensional FFTs. Such transforms are well known to those in the art.

Alternatively, decimated versions of content endpoint frames may be used. The producer may distribute a small bit of untransformed content (e.g., 20 ms of audio or one frame of video) to allow the home server to correlate and find the end points.

Additionally, downloadable instructions 260 from the media producer to the home media server direct the media server to search, bid for, obtain rights to schedule and manage the recording of broadcast, on-demand, and other media content, such as movies, music, games, advertisements, etc. The media producer may also deliver downloadable instructions 260 to direct the home media server to search, bid for, etc., media processing software modules required to create the edited program.

In another embodiment of the present invention, downloadable instructions 260 allow advertisement selection, content choices, etc., to be based on viewer behavior and metrics. Viewing history, purchasing history, etc., may be securely stored in the home media server, but used to control content selection, surfing, and directed advertising.

Home media servers, having downloaded this data, may now use this data to emulate 270 the steps taken by the producer outlined above to assemble an edited program similar to that specified by the producer.

The editing steps of the producer are saved and used to create a set of instructions for the home media servers. These instructions instruct a home media server to "emulate," 270, i.e. repeat the steps taken by the producer. Certain messages allow the home server to find the video and audio "raw" content specified. If the content is not found on the home server, or delivered via the Internet from the producer, it may downloaded from remote content servers. Other messages direct the home server to synchronize, edit, and combine the raw content selections in virtually the same way as the producer and to output the resulting data stream output for display.

Using this method, the home media server only emulates the content selection, ordering, and processing choices of the producer. No copyright restricted material is transferred from producer to consumer. In fact, the consumer is viewing content that he/she has a right to view. In this process, the new work of art is a set of content selecting, time-shifting, processing, and combining instructions used to control how home media servers playback the content.

Figure 3:
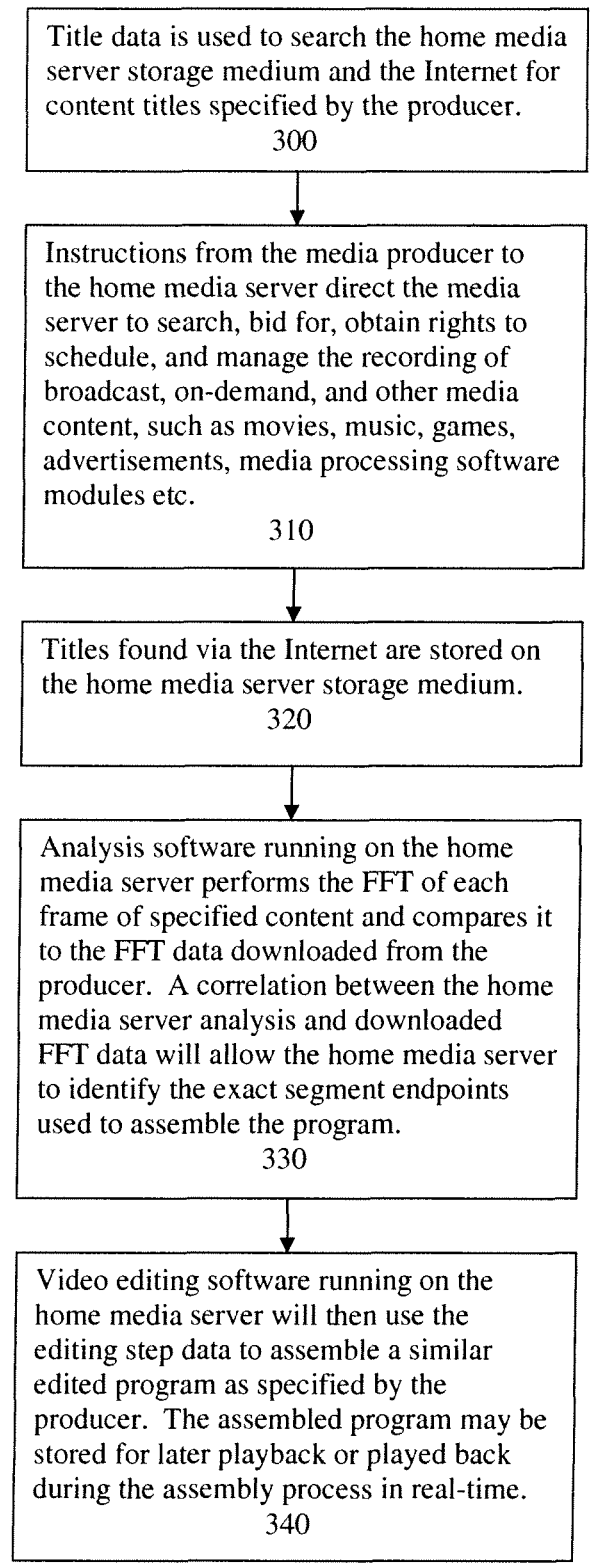
FIG. 3 illustrates a flow chart for emulation by a home media server of steps taken by a producer to create an edited program according to an embodiment of the present invention.

FIG. 3 illustrates a flow chart for home media server emulation of steps taken by a producer to create an edited program. Title data is used to search 300 the home media server storage medium and the Internet, for example, for content titles specified by the producer. Instructions 310 from the media producer to the home media server direct the home media server to search, bid for, obtain rights to schedule, and manage the recording of broadcast, on-demand, and other media content, such as movies, music, games, advertisements, etc. If titles are found via the Internet, they are stored on the home media server storage medium 320.

After all titles are found, analysis software 330 running on the home media server performs the FFT of each frame of the specified content and compares it to the FFT data downloaded from the media producer. A correlation between the home media server analysis and downloaded media producer FFT data allows the home media server to identify the exact segment endpoints used to assemble the program.

Alternatively, decimated versions of content endpoint frames may be used to perform the correlation. The small bits of untransformed content (e.g., 20 ms of audio or one frame of video) distributed by the media producer may allow the home server to perform a correlation to find the end points.

Video editing software running on the home media server uses the editing step data to assemble 340 a similar edited program as specified by the producer. The assembled program may be stored for later playback, or played back during the assembly process in real-time.

In summary, the present invention allows instructions from media producers to control home media servers in a way that adds value to home content libraries. A home media server, such as a set-top box, manages and processes consumer content, such as movies and music. The home media server only emulates the content selection, ordering, and processing choices of the media producer. For example, a producer may create a documentary on New York in the 1940's using images stored from home documentaries on jazz and World War II combined with home stored music. The producer may also download to the consumer original voiceover content. The consumer is viewing content that he/she has a right to view. In this process, the new work of art is a set of content selecting, time-shifting, processing, and combining instructions used to control how home media servers playback the content. This method enables media producers to use home stored recordings as an open source of content on top of which they can create new layers of media products for the public While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. An apparatus that is capable of communicating, when the apparatus is in operation, with a remote computer via at least one Internet connection, the apparatus also being capable of being used in association with a monitor, the apparatus comprising:
   a media processing hardware system comprising non-transitory storage, the media processing hardware system to search for, purchase, and download, via the at least one Internet connection, from the remote computer, downloadable purchasable audio content and downloadable purchasable video content that are to be edited to produce combined media content, the media processing hardware system also being capable of downloading from the remote computer via the at least one Internet connection, downloadable instructions to be stored in the storage and executed by the media processing hardware system;
   the media processing hardware system comprising editing software to be stored in and executed by the media processing hardware system to permit selection, editing, and combining of selected segments of the video content and the downloadable audio content to produce the combined media content, the combined media content being capable of being stored in the storage at the system, the software being capable of permitting (1) identification of endpoints of content segments to be used in producing the combined media content and (2) transition effects and other effects to be provided to the content segments in the combined media content;
   the media processing system to permit viewing of the combined media content via the monitor at the system; and
   the media processing system to permit distributing, via the at least one Internet connection, of the combined media content.

2. The apparatus of claim 1, wherein:
   the system is to provide direct advertisements based upon purchase history.

3. The apparatus of claim 1, wherein:
   the media processing system comprises home multimedia processing software.

4. The apparatus of claim 1, wherein:
   the media processing system is capable of allowing a game to be displayed.

5. The apparatus of claim 1, wherein:
   the combined media content comprises software content.

6. A method implemented, at least in part, by a media processing hardware system, the system being capable of communicating, when the media processing hardware system is in operation, with a remote computer via at least one Internet connection, the media processing hardware system also being capable of being used in association with a monitor, the method comprising:
   searching for and purchasing, by the media processing hardware system, via the at least one Internet connection, from the remote computer, downloadable purchasable audio content and downloadable purchasable video content that are to be edited to produce combined media content, the media processing hardware system comprising non-transitory storage;
   downloading to the media processing system, via the at least one Internet connection and the remote computer, the downloadable audio content, the downloadable video content, and downloadable instructions, the downloadable instructions to be stored in the storage and executed by the media processing hardware system;
   using editing software comprised in the media processing hardware system to select, edit, and combine selected segments of the downloadable video content and the downloadable audio content to produce the combined media content, the combined media content being capable of being stored in the storage at the system, the software being capable of permitting (1) identification of endpoints of content segments to be used in producing the combined media content and (2) transition effects and other effects to be provided to the content segments in the combined media content;
   viewing, at the media processing system, via the monitor, the combined media content; and
   distributing from the media processing hardware system, via the at least one Internet connection, the combined media content.

7. The method of claim 6, wherein:
   the system is to provide direct advertisements based upon purchase history.

8. The method of claim 6, wherein:
   the media processing system comprises home multimedia processing software.

9. The method of claim 6, wherein:
   the media processing system is capable of allowing a game to be displayed.

10. The method of claim 6, wherein:
    the combined media content comprises software content.

11. A non-transitory storage medium storing instructions that when executed by a media processing hardware system results in the media processing hardware system being capable of performance of operations, the media processing hardware system being capable of communicating, when the media processing hardware system is in operation, with a remote computer via at least one Internet connection, the media processing hardware system also being capable of being used in association with a monitor, the operations comprising:
    searching for and purchasing, by the media processing hardware system, via the at least one Internet connection, from the remote computer, downloadable purchasable audio content and downloadable purchasable video content that are to be edited to produce combined media content, the media processing hardware system comprising non-transitory storage;
    downloading to the media processing hardware system, via the at least one Internet connection and the remote computer, the downloadable audio content, the downloadable video content, and downloadable instructions, the downloadable instructions to be stored in the storage and executed by the media processing hardware system;
    permitting selection, editing, and combining, via editing software stored in the storage and executed by the system, of selected segments of the downloadable video content and the downloadable audio content to produce the combined media content, the combined media content being capable of being stored in the storage at the system, the software being capable of permitting (1) identification of endpoints of content segments to be used in producing the combined media content and (2) transition effects and other effects to be provided to the content segments in the combined media content;

viewing, at the media processing system, via the monitor, the combined media content; and distributing from the media processing system, via the at least one Internet connection, the combined media content.

12. The storage medium of claim 11, wherein:
the system is to provide direct advertisements based upon purchase history.

13. The storage medium of claim 11, wherein:
the media processing system comprises home multimedia processing software.

14. The storage medium of claim 11, wherein:
the media processing system is capable of allowing a game to be displayed.

15. The storage medium of claim 11, wherein:
the combined media content comprises software content.

* * * * *